March 21, 1950  T. R. WIESEMAN ET AL  2,500,971
SANITARY MOTOR CONSTRUCTION
Filed Oct 17, 1947  2 Sheets-Sheet 1

Inventors
Theodore R. Wieseman
Russell I. Robinson
Francis J. Rathbun
By Ira Milton Jones
Attorney March 21, 1950     T. R. WIESEMAN ET AL     2,500,971
SANITARY MOTOR CONSTRUCTION
Filed Oct. 17, 1947     2 Sheets—Sheet 2
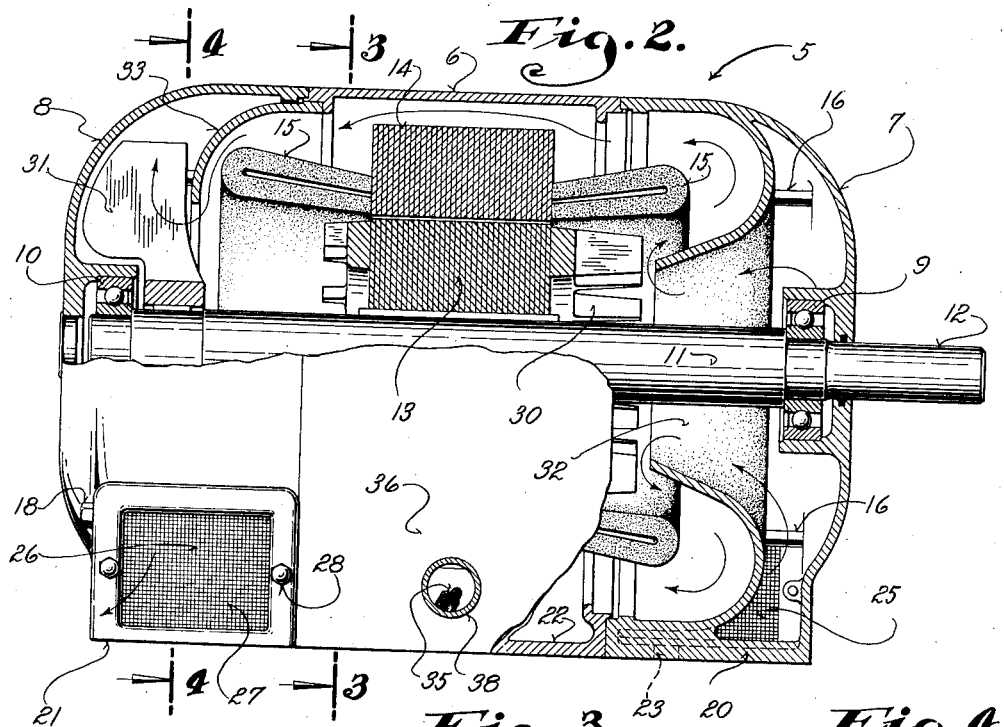
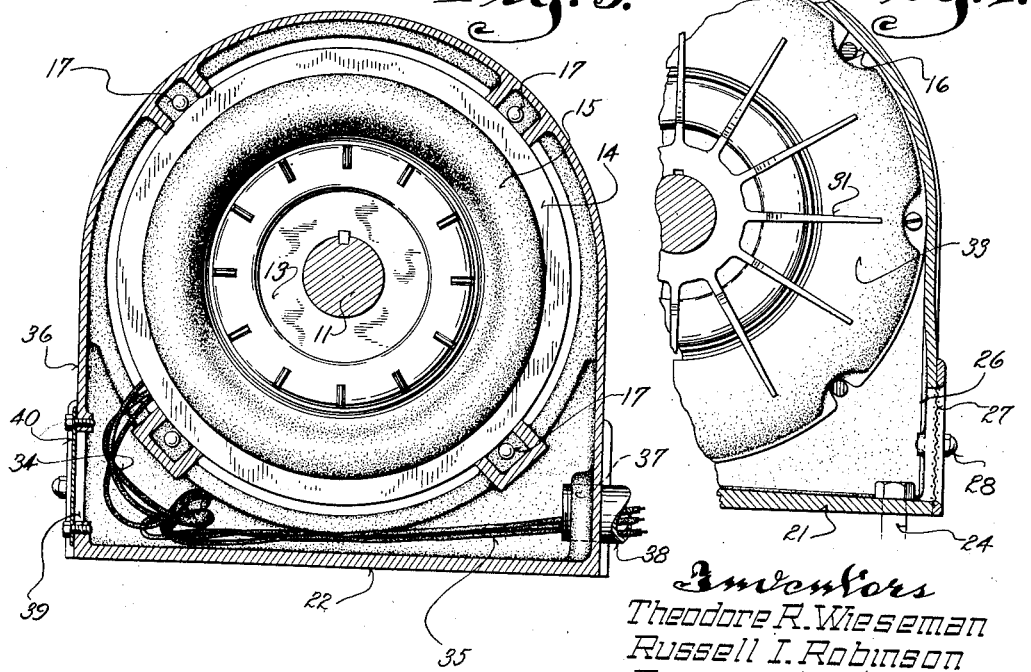
Inventors
Theodore R. Wieseman
Russell I. Robinson
Francis J. Rathbun
By Ira Milton Jones
Attorney Patented Mar. 21, 1950

2,500,971

UNITED STATES PATENT OFFICE 2,500,971

SANITARY MOTOR CONSTRUCTION

Theodore R. Wieseman, Russell I. Robinson, and Francis J. Rathbun, Milwaukee, Wis., assignors to The Louis Allis Company, Milwaukee, Wis., a corporation of Wisconsin Application October 17, 1947, Serial No. 780,510

10 Claims. (Cl. 171—252)

This invention relates to electric motors and has for its purpose the provision of a sanitary motor which will meet the specifications adopted jointly by the International Association of Milk Sanitarians and the National Electric Manufacturers Association. Generally these specifications require that the motor be:

1. Readily mounted in a sanitary manner on food and milk processing equipment.
2. Easily maintained in a clean and sanitary condition.
3. Enclosed in a manner to prevent the entrance of vermin or the escape of lubricant.
4. Built practically from the standpoint of bearing maintenance, lubrication and ventilation.

In past attempts to design motors to meet these specifications a serious difficulty was encountered in meeting the requirement that there be large clearances under the motor frame and between the supporting feet so that it would be easy to clean under the motor and around its feet. It is obvious that pockets in which dirt or vermin might accumulate would be intolerable at or about the mounting of a motor of this character.

It is, therefore, particularly an object of this invention to provide an improved manner of securing the motor to its support which entirely obviates the objections heretofore encountered in this connection.

More specifically, it is an object of this invention to provide an electric motor wherein the space over the holes which receive the anchor bolts is accessible only from the interior of the motor housing, and where access to this space for manipulation of the anchor bolts is had through screened openings which also serve as air inlet and outlet ports.

Another object of this invention is to provide a motor of the character described having all of its external portions so constructed and shaped as to avoid abrupt changes in contour thus precluding the existence of pockets or corners in which dirt and vermin can accumulate.

Another object of this invention is to provide an electric motor of the character described which meets the NEMA standards set for splash-proof motors.

Another object of this invention is to provide an improved manner of wiring a motor, i. e., of connecting its leads to the supply lines, which eliminates the need for the conventional conduit box and avoids objectionable protrusions on the exterior of the motor.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 2 is a view partially in side elevation and partially in longitudinal section illustrating particularly the manner in which ventilating air is caused to flow through the motor;

Figure 3 is a cross-sectional view taken through Figure 2 on the plane of the line 3—3; and Figure 4 is a partial cross-sectional view taken through Figure 2 on the plane of the line 4—4.

Figure 1:
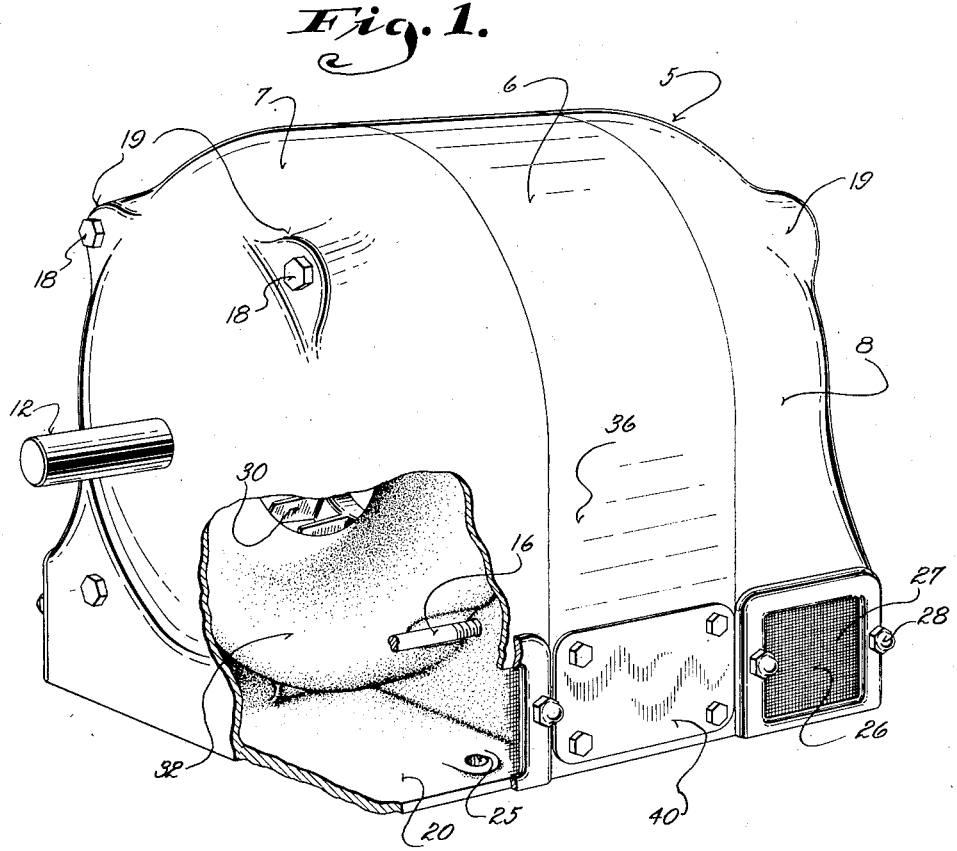
Figure 1 is a perspective view of an electric motor constructed in accordance with this invention.

Referring now particularly to the accompanying drawings in which like numerals indicate like parts, the numeral 5 indicates generally the housing of the motor, which consists of a center section 6, generally referred to as the frame, and two end sections 7 and 8, often referred to as end bells. These end sections or end bells carry bearings 9 and 10 respectively in which the armature shaft 11 is journalled. One end 12 of the shaft protrudes through an appropriate opening in the end wall of the end section 7, and a rotor 13 of conventional design is keyed to the shaft to revolve within a stator 14 located within the center section or frame 6. The stator is provided with the customary windings 15 which extend into the end sections or end bells as clearly shown in Figure 2.

The three sections of the housing are complementary to each other and are preferably provided with inter-engaging flanges. They are held assembled by tie bolts 16 having their heads 18 bearing against pads 19 on the outer faces of the end sections and their ends threaded into tapped holes in the center section or frame as at 17. The pads 19 are formed in such a manner as to avoid abrupt changes in contour, as shown in Figure 1, thereby precluding areas upon which dirt and vermin can accumulate. Attention is directed to the fact that the absence of abrupt changes in contour characterizes the entire exterior of the housing.

The bottom of the housing is flat so that its entire area has planar engagement with a flat supporting surface. Moreover the bottom of the housing is closed by a continuous bottom wall formed jointly by bottom walls 20 and 21 in the end sections 7 and 8 respectively, and a bottom wall 22 in the center section or frame 6.

While it is preferable that the entire bottom of the housing be one flat plane for the purpose of preventing dirt and vermin from reaching the underside of the motor, it is sufficient that the periphery of the bottom lie in a flat plane to have flush engagement with a flat supporting surface, or if the supporting surface upon which the motor is to be mounted is non-planar the bottom of at least the periphery thereof should be shaped to be complementary to the supporting surface.

Attention is directed to the fact that the walls which form the ends of the end bells as well as the sides of the center section or frame 6 extend all the way down to the bottom wall so as to have contact with the supporting surface upon which the motor is mounted. Thus all of the side and end walls of the housing extend upward perpendicular to the motor supporting surface, and there are no small corners or pockets formed by the sides or ends of the motor and the surface upon which it rests in which dirt can accumulate.

The bottom walls 20 and 21 of the end sections have bolt holes 23 located near their side edges for the reception of anchor bolts 24, but since the side walls extend down to the bottom wall as described, access to the space over these bolt holes can be had only from the inside of the housing. To afford access to this space the side walls of the end sections 7 and 8 have openings 25 and 26 respectively, preferably adjacent to the bolt holes 23.

As will be hereinafter described, these openings also provide air inlet and outlet openings. They are closed against the entry of vermin by screened or foraminous covers 27 removably secured in any suitable manner as by ball headed cap screws 28.

The top surfaces of the bottom walls 20 and 21 slope downwardly and outwardly toward the openings 25 and 26 so that any liquid which might splash through the openings can drain therefrom.

Cooling and ventilating air enters the motor housing through the screened openings 25 in both sides of one end section and leaves the same through the openings 26 in both sides of the other end section, as indicated by the arrows in Figure 2. This flow of air is produced by the conjoint action of two fans 30 and 31, the former cast integrally with the rotor and the latter secured to the opposite end of the armature shaft, and two baffles 32 and 33. The baffle 32 projects radially inwardly from the medial portion of the end bell 7 to terminate in a conical discharge portion which directs the air radially and axially inwardly. Lying between the inlet openings 25 and the operating parts of the motor, it guards against the entry of water and other liquids which might be splashed through the screened openings 25.

Attention is directed to the fact that the lip of the discharge end of the baffle 32 lies well within the adjacent ends of the stator coils and that it terminates close to the fan 30. This arrangement creates a low pressure area at the lip of the baffle 32 so that air entering the screened openings 25 flows radially and axially inwardly toward the fan 30, to be thereby thrown radially outwardly against the ends of the stator coils. The air then flows through the annular passage formed by the stator coil ends and the adjacent side of the baffle 32, which serves to reverse the direction of its flow. It is then guided axially toward the opposite end of the motor through the space between the stator core and the housing to enter the annular space defined by the baffle 33 and the adjacent stator coil ends. The baffle 33 has its discharge end opening to the fan 31 which, working in series with the rotor fan 30, draws the air through the passages described and expels it through the screened openings 26 on both sides of the motor. The baffle 33, like the baffle 32, is located between the working parts of the motor and the screened openings 26 and thus prevents water and other liquids from being splashed into the interior of the motor through the screened openings 26.

The wiring of the motor, that is, the connection of its leads 34 to supply lines 35, is accomplished in a simple and direct manner which entirely obviates the need for conventional outlet boxes or other equivalent structures mounted on the exterior of the motor.

As best shown in Figure 3, the side walls 36 of the center section or frame 6 extend vertically down from the full diameter of the motor housing, thereby providing substantial space under the opposite side portions of the stator. One side wall 36 has a tapped hole 37 into which a conduit 38 is threaded. The supply leads 35 are brought into the motor housing through the conduit 38 and passed transversely beneath the stator, to the opposite side of the housing. Since the side wall 36 has an access hole 39, closed by a removable cover 40, the leads 34 and the supply lines 35 can be brought out through the opening 39 to enable the same to be properly connected. When the connections are made the wires are pushed back into the motor housing and the cover replaced. In this way wiring of the motor is accomplished in a manner that meets all electrical requirements and involves no objectionable protrusions on the exterior of the motor.

From the foregoing description taken in connection with the accompanying drawings, it will be readily apparent to those skilled in the art that this invention provides an electrical motor especially well adapted for use in situations requiring the utmost cleanliness since it provides a structure which positively precludes the entry of vermin into the interior of the motor or the accumulation of vermin or dirt on exterior surfaces hard to reach with an ordinary spray or other cleaning medium.

It will also be apparent to those skilled in the art that while this invention is especially adapted to the so-called sanitary motor it has many features beneficial to motors of general utility as for instance motors used on machine tools. Its freedom from inaccessible cavities in the housing enhances the appearance of the machine on which the motor is used, and its protection against the ingress of foreign particles makes the motor ideal for use in locations where chips and dirt are being constantly thrown about.

What we claim as our invention is:

1. In an electric motor: a housing including end bells each of which has an air opening leading to the interior of the housing; an annular baffle projecting inwardly from the wall of one of said end bells and lying between the air opening therein and the central portion of the housing, said baffle directing air entering said opening axially and radially inward toward the center of the housing; a rotatable air impeller adjacent to the discharge end of said baffle to draw air through said opening and across the baffle to the other side thereof; means coacting with said baffle to deflect the air at the other side thereof along the inner surfaces of the housing toward the opposite end of the motor; a second annular baffle at said opposite end of the motor for deflecting such air radially inward, said second annular baffle lying between the air opening in the adjacent end bell and the interior of the motor; and a rotatable impeller disposed between the discharge end of said second annular baffle and the wall of the adjacent end bell, said last named impeller acting in series with the other impeller to discharge the air through the opening in said last named end bell.

2. In an electric motor: a housing having upright opposite side and opposite end walls merging with said side walls at the corners of the housing, the exterior surfaces of said side and end walls extending directly down to the bottom edges of the housing so that upon fastening the housing to a supporting surface shaped to fit the bottom of the housing the side and end walls bottom on said supporting surface; walls extending inwardly from said housing walls near the bottom edges of the housing, said inwardly extending walls having holes to receive anchor screws by which the motor housing is securable to the supporting surface, and the housing walls having openings therein through which access may be had to the space within the housing above those portions of the inwardly extending walls having said holes therein, said openings also providing air inlet and outlet ports; impeller means in the housing for inducing air circulation into and out of the housing through said openings; and foraminous closures movably secured to the housing in positions covering said openings to prevent entry of vermin.

3. In an electric motor: a housing comprising a pair of spaced apart end sections and a center section joining said end sections, all of said sections being of inverted U-shape in cross section and having their adjacent exterior surfaces forming substantially unbroken continuations of each other, the end sections having end walls joining the side walls of the housing and cooperating therewith to form four corners at the junctions of said walls, and said end walls carrying the bearings in which the rotor of the motor is journalled, all portions of the bottom edges of all of the sections being coplanar and constituting the extreme bottom of the housing so as to close off access to the housing interior from the underside upon securement of the housing to a flat supporting surface; inwardly directed walls on the end sections provided with bolt holes near the corners of the housing, the axes of which are perpendicular to the bottom plane of the housing to receive anchor bolts by which the housing is securable to a supporting surface, the end sections having openings adjacent to said bolt holes to provide access to anchor bolts therein, said openings also providing air inlet and outlet ports for the housing; impeller means in the housing for inducing air circulation into and out of the housing through said openings; and foraminous closures movably secured to the housing in positions covering said openings to prevent entry of vermin into the housing.

4. In an electric motor, the housing of claim 3 further characterized by the fact that each end section has two access openings, one located in the lower portion of each side wall thereof.

5. In an electric motor: a housing comprising a pair of spaced apart end sections and a center section joining the end sections, all of said sections being of inverted U-shape in cross section; the external surfaces of the side walls of the center section extending down to and terminating on a bottom plane; a bottom wall for the center section joining the side walls thereof, no portion of said bottom wall projecting below said plane; the end sections being complementary to the center section and having walls shaped to form continuations of the side and top walls of the center section, the external surfaces of said end sections likewise extending down to and terminating on said bottom plane so that all portions of the underside of the housing at the exterior thereof lie in said plane to have flush engagement with a flat supporting surface; bottom walls on the end sections closing the undersides thereof, said bottom walls on the end sections being substantially in line with the bottom wall on the center section, and no portion of said bottom walls on the end sections projecting beneath said bottom plane, said bottom walls on the end sections having bolt holes for the reception of anchor bolts the heads of which are accessible only from the interior of the end sections, and said end sections having access holes above the bottom walls thereof and through which access may be had to the space over the bolt holes for the manipulation of anchor bolts received therein; and movable foraminous closures secured to the housing in positions covering the access openings to prevent entry of vermin into the housing.

6. In an electric motor: a housing including spaced end sections joined by a center section, said center section having upright side walls spaced a substantial distance from the adjacent portions of the motor stator so as to define chambers at opposite sides of the stator connected by a space under the stator; a conductor conduit opening through one of said side walls of the center section; supply conductors extending from said conduit through said side wall into the adjacent chamber and transversely across the center section through the space under the stator and into the chamber at the opposite side of said center section, the opposite side wall of the center section having an access hole through which access may be had to the adjacent chamber and to the ends of the said supply conductors for making connection thereof to the motor leads; and a closure for said access hole.

7. In a vermin-proof electric motor: a housing having side and end walls which extend directly down to the supporting surface upon which the motor is mounted, said side and end walls being free from abrupt changes in contour so as to preclude areas upon which dirt and vermin can accumulate, and said side walls being spaced a distance from the motor stator to define chambers at opposite sides of the stator joined by a space under the stator; and means for electrically connecting the motor with a supply line in a manner obviating objectionable protrusions on the exterior of the motor comprising, a conduit secured directly to one side wall of the motor housing, supply conductors extending from the conduit through said side wall into the adjacent chamber in the housing interior and transversely through said space under the stator to the chamber at the opposite side of the housing; the side wall at said opposite side of the housing having an access hole through which access may be had to the supply conductors for connecting them to the motor leads; and a closure for said access hole.

8. In an electric motor, the combination of: a housing having opposite side and opposite end walls, said housing having openings therein near its ends; a motor shaft journalled in bearings carried by the end walls of the housing; a stator surrounding the motor shaft and having exterior surfaces closely adjacent to the inner wall surfaces of the housing; an annular baffle inside the housing near one end thereof and having portions disposed between the interior of the housing and the opening in the adjacent end of the housing for directing air entering said opening radially and axially inwardly into the housing; an impeller driven by the motor shaft and situated inwardly of said baffle for drawing air into the adjacent opening and across the baffle into the interior of the housing; a second annular baffle in the housing at the opposite end of the motor for directing air flowing along the interior of the housing toward said opposite end thereof radially inwardly toward the motor shaft, said second baffle being interposed between the opening in said opposite end of the motor housing and the interior of the housing; and an impeller on the motor shaft between said second baffle and the adjacent end wall of the motor housing for discharging air flowing past said second baffle from the interior of the housing outwardly through the adjacent opening in the motor housing, said last named impeller acting in series with the first designated impeller for inducing circulation of air into, and out of the housing through said openings at the ends thereof.

9. In an electric motor having a stator: a housing enclosing said stator and having opposite end walls, and a top wall and opposite side walls which closely hug the exterior of the stator, said housing having an air inlet opening at one end and an air discharge opening at its other end; a motor shaft journalled in bearings carried by the end walls of the housing and rotatable inside the stator; a pair of annular baffles fixed with relation to the housing walls and each interposed between the interior of the housing and one of said openings in the housing, each of said baffles having a central opening therein through which the motor shaft projects and through which air may circulate; and a pair of impellers carried by the motor shaft to act in series with one another, the impeller at the air inlet end of the housing being positioned between the stator and the adjacent baffle, and the impeller at the air discharge end of the housing being interposed between the adjacent end wall of the housing and the baffle at said air discharge end of the housing, and said impellers having a diameter no greater than that of the stator.

10. In an electric motor: a housing having upright opposite side and opposite end walls merging with one another, the exterior surfaces of all of said walls extending directly down to the bottom edges of the housing so that upon fastening the housing to a supporting surface shaped to fit the bottom of the housing all of said upright walls bottom on the supporting surface with their exterior surfaces rising directly up from the supporting surface; certain of said upright housing walls having openings at opposite ends of the motor to provide air inlet and outlet ports; impeller means for inducing air circulation into and out of the housing through said openings; walls extending inwardly from said upright housing walls near the bottom thereof and having portions thereof near said openings, said portions having holes therein for the reception of anchor screws; and foraminous closures movably secured to the housing in positions covering said openings to prevent entry of vermin into the housing, displacement of said closures affording access to the space within the housing above the said portions of the inwardly extending walls.

THEODORE R. WIESEMAN.
RUSSELL I. ROBINSON.
FRANCIS J. RATHBUN.

REFERENCES CITED

The following references are of record in the file of this patent:

UNITED STATES PATENTS

| Number | Name | Date |
|---|---|---|
| 893,681 | Waters | July 21, 1908 |
| 1,502,065 | Smith | July 22, 1924 |
| 1,720,364 | Holmes | July 9, 1929 |
| 1,824,839 | Ross | Sept. 29, 1931 |
| 1,884,959 | Allendorf | Oct. 25, 1932 |
| 1,909,497 | Nielson | May 16, 1933 |
| 1,951,877 | Leland | Mar. 20, 1934 |
| 2,074,067 | Darnell | Mar. 16, 1937 |
| 2,139,379 | Myers | Dec. 6, 1938 |
| 2,174,297 | Way | Sept. 26, 1939 |

FOREIGN PATENTS

| Number | Country | Date |
|---|---|---|
| 361,278 | Italy | July 18, 1938 |